(12) United States Patent
Zaidi et al.

(10) Patent No.: US 10,045,324 B2
(45) Date of Patent: Aug. 7, 2018

(54) METHODS AND NODES FOR MANAGING RSTD REPORTS

(71) Applicant: Telefonaktiebolaget LM Ericsson (publ), Stockholm (SE)

(72) Inventors: Ali Zaidi, Järfälla (SE); Sara Modarres Razavi, Linköping (SE); Fredrik Gunnarsson, Linköping (SE); Meng Wang, Sundbyberg (SE); Yufei Blankenship, Kildeer, IL (US); Henrik Rydén, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/510,782

(22) PCT Filed: Mar. 3, 2016

(86) PCT No.: PCT/SE2016/050169
§ 371 (c)(1),
(2) Date: Mar. 13, 2017

(87) PCT Pub. No.: WO2016/186545
PCT Pub. Date: Nov. 24, 2016

(65) Prior Publication Data
US 2017/0289947 A1   Oct. 5, 2017

Related U.S. Application Data

(60) Provisional application No. 62/161,909, filed on May 15, 2015.

(51) Int. Cl.
*H04W 64/00*   (2009.01)
*G01S 5/10*   (2006.01)
(Continued)

(52) U.S. Cl.
CPC ........... *H04W 64/00* (2013.01); *G01S 5/0236* (2013.01); *G01S 5/10* (2013.01); *H04W 84/042* (2013.01)

(58) Field of Classification Search
CPC ....... H04W 64/00; H04W 84/042; G01S 5/10; G01S 5/0236
See application file for complete search history.

(56) References Cited

U.S. PATENT DOCUMENTS 7,812,718 B1 * 10/2010 Chan ..................... G01S 5/0289
340/539.13
9,609,539 B2 * 3/2017 Edge ..................... H04W 24/10
(Continued)

FOREIGN PATENT DOCUMENTS

WO   2011097760 A1   8/2011
WO   2014021771 A2   2/2014
WO   2016049551 A1   3/2016

OTHER PUBLICATIONS

Written Opinion for International Patent Application No. PCT/SE2016/050169, dated Apr. 5, 2017, 7 pages.
(Continued)

*Primary Examiner* — Nathan Mitchell
(74) *Attorney, Agent, or Firm* — Withrow & Terranova, PLLC

(57) ABSTRACT

The disclosed embodiments herein relate to a method performed by a UE; a UE, a method performed by a location server and a location server and computer programs respectively. The method performed by the UE comprises: receiving from a location server NetWork assisted Reference Signal Time Difference, RSTD, Quantization Information, NW-QI; performing RSTD measurements by measuring or estimating a Time Of Arrival, TOA, of a Positioning Reference Signal, PRS, from respective base station of a plurality of base stations; encoding the RSTD measurements by
(Continued)

employing a Enhanced RSTD Quantization Method, E-QM, or by using the NW-QI while encoding the RSTD measurements; and sending UE assisted RSTD Quantization Information, UE-QI, to the location server, the UE-QI including the encoded RSTD measurements.

23 Claims, 11 Drawing Sheets

(51) Int. Cl.
*G01S 5/02* (2010.01)
*H04W 84/04* (2009.01)

(56) References Cited

U.S. PATENT DOCUMENTS

| | | | | |
|---|---|---|---|---|
| 2009/0137304 | A1* | 5/2009 | Yacenda | G07F 17/3237 463/17 |
| 2011/0205122 | A1 | 8/2011 | Siomina et al. | |
| 2014/0213289 | A1* | 7/2014 | Xiao | H04W 64/00 455/456.1 |
| 2014/0335889 | A1* | 11/2014 | Wytych | H04W 4/023 455/456.1 |
| 2015/0133152 | A1* | 5/2015 | Edge | G01S 5/0236 455/456.1 |
| 2016/0205499 | A1* | 7/2016 | Davydov | H04W 4/02 455/456.1 |
| 2016/0234709 | A1* | 8/2016 | Fischer | H04W 4/02 |
| 2016/0295374 | A1* | 10/2016 | Persson | G01S 5/0036 |

OTHER PUBLICATIONS

Author Unknown, "Technical Specification Group Radio Access Network; Evolved Universal Terrestrial Radio Access Network (E-UTRAN); Stage 2 functional specification of User Equipment (UE) positioning in E-UTRAN :Release 12)," Technical Specification 36.305, Version 12.2.0, 3GPP Organizational Partners, Dec. 2014, 59 pages.
Ericsson, "R1-151944: Refined RSTD reporting," 3rd Generation Partnership Project (3GPP), TSG RAN WG1 Meeting #80bis, Apr. 20-24, 2015, 2 pages, Belgrade, Serbia.
Huawei et al., "R1-151870: OTDOA enhancements for indoor positioning," 3rd Generation Partnership Project (3GPP), TSG RAN WG1 meeting #80bis, Apr. 20-24, 2015, 3 pages, Belgrade, Serbia.
Huawei et al., "R1-152323: Way forward on evaluation for possible enhancements for OTDOA," 3rd Generation Partnership Project (3GPP), TSG RAN WG1 Meeting #80bis, Apr. 20-24, 2015, 2 pages, Belgrade, Serbia.
International Search Report and Written Opinion for International Patent Application No. PCT/SE2016/050169, dated May 23, 2016, 15 pages.
Author Unknown, Technical Specification Group Core Network and Terminals; Location Services (LCS); LCS Application Protocol (LCS-AP) between the Mobile Management Entity (MME) and Evolved Serving Mobile Location centre (E-SMLC); SLs interface (Release 13), Technical Specification 29.171, Version 13.1.0, 3GPP Organizational Partners, Dec. 2015, 54 pages.
Author Unknown, Technical Specification Group Core Network and Terminals; Location Services (LCS); Evolved Packet Core (EPC) LCS Protocol (ELP) between the Gateway Mobile Location Centre (GMLC) and the Mobile Management Entity (MME); SLg interface (Release 13), Technical Specification 29.172, Version 13.0.0, 3GPP Organizational Partners, Dec. 2015, 40 pages.
Author Unknown, "Technical Specification Group Radio Access Network; Evolved Universal Terrestrial Radio Access (E-UTRA); Requirements for support of radio resource management (Release 13)," Technical Specification 36.133, Version 13.2.0, 3GPP Organizational Partners, Jan. 2016, 1517 pages.
Author Unknown, Technical Specification Group Radio Access Network; Evolved Universal Terrestrial Radio Access (E-UTRA); Radio Resource Control (RRC); Protocol Specification (Release 13), Technical Specification 36.331, Version 13.0.0, 3GPP Organizational Partners, Dec. 2015, 507 pages.
Author Unknown, Technical Specification Group Radio Access Network; Evolved Universal Terrestrial Radio Access (E-UTRA); LTE Positioning Protocol (LPP) (Release 13), Technical Specification 36.355, Version 13.0.0, 3GPP Organizational Partners, Dec. 2015, 149 pages.
Author Unknown, Technical Specification Group Radio Access Network; Evolved Universal Terrestrial Radio Access (E-UTRA); LTE Positioning Protocol A (LPPa) (Release 13), Technical Specification 36.455, Version 13.0.0, 3GPP Organizational Partners, Dec. 2015, 62 pages.
Ericsson, et al., "R4-165279: Higher resolution RSTD measurement report mapping," 3rd Generation Partnership Project (3GPP), TSG RAN WG4 Meeting #80 (Change Request for 36.133 CR 3690), Aug. 22-26, 2016, Gothenburg, Sweden, 2 pages.
Qualcomm Incorporated, et al., "R2-169082: Introduction of Further Indoor Positioning Enhancements," 3rd Generation Partnership Project (3GPP), TSG RAN WG2 Meeting #96 (Change Request for 36.355 CR 0161), Nov. 14-18, 2016, Reno, Nevada, USA, 21 pages.

* cited by examiner

METHODS AND NODES FOR MANAGING RSTD REPORTS

This application is a 35 U.S.C. § 371 national phase filing of International Application No. PCT/SE2016/050169, filed Mar. 3, 2016, which claims the benefit of U.S. Provisional Application No. 62/161,909, filed May 15, 2015, the disclosures of which are incorporated herein by reference in their entireties.

TECHNICAL FIELD

The embodiments herein relate to wireless communication systems, such as radio telecommunication systems, cellular radio communication systems and the like and in particular to methods and apparatuses for managing Reference Signal Time Difference (RSTD) measurement reports.

BACKGROUND

Positioning Architecture

FIG. 1 depicts an example of a LTE positioning architecture. Positioning in Long Term Evolution (LTE) is supported by the architecture in FIG. 1, with direct interactions between a user equipment (110) and a location server (120), such as Evolved-Serving Mobile Location Centre (E-SMLC), is via a LTE Positioning Protocol (LPP). Moreover, there are also interactions between the location server and the eNodeB (130) via a LPP protocol, to some extent supported by interactions between the eNodeB and the UE via the Radio Resource Control (RRC) protocol.

The following positioning techniques are considered in LTE, e.g. in Third Generation Partnership Project (3GPP) Technical Specification (TS) 36.305:

Enhanced Cell ID. Essentially cell ID information to associate the UE to the serving area of a serving cell, and then additional information to determine a finer granularity position.

Assisted GNSS. GNSS information retrieved by the UE, supported by assistance information provided to the UE from E-SMLC OTDOA (Observed Time Difference of Arrival). The UE estimates the time difference of reference signals from different base stations and sends to the E-SMLC for multi-lateration.

Uplink Time Difference of Arrival (UTDOA). The UE is requested to transmit a specific waveform that is detected by multiple location measurement units (e.g. an eNB) at known positions. These measurements are forwarded to E-SMLC for multi-lateration.

FIG. 2 depicts OTDOA position estimation based on multi-laceration of the RSTD measurements. The Observed Time Difference Of Arrival (OTDOA) is a UE-assisted method, in which the UE measures the Time Of Arrival (TOA) of specific Positioning Reference Signals (PRS) from multiple eNBs, and computes the relative differences, i.e. Reference Signal Time Differences (RSTD). The RSTD are quantized and reported via LPP to the E-SMLC together with an accuracy assessment. Based on known positions of eNBs and their mutual time synchronization, it is possible for the E-SMLC to estimate the UE position from the RSTD and covariance reports using multi-lateration. The accuracy depends on the radio conditions of the received signals, number of received signals as well as the deployment, which means that it will vary spatially. FIG. 2 illustrates the multi-lateration in OTDOA while considering eNB1 as the reference cell.

RSTD Measurement Reporting

The UE estimates the time of arrival of a reference signal from a detected reference cell and other detected cells based on assistance information received from E-SMLC. Then, the UE computes the Reference Signal Time Difference (RSTD) of each reference signal for all detected cells in relation to time of arrival of the reference signal from the detected reference cell. The RSTD is subject to a quantization with a resolution of 1 $T_s$ for RSTDs within $\pm 4096$ $T_s$, and 5 $T_s$ otherwise (1 $T_s=1/(15000 \times 2048)$ sec is the LTE basic time unit). The UE then sends a RSTD measurement report, including the quantized RSTD, to the location server.

In addition, the UE estimates the RSTD measurement quality and reports, e.g. in a RSTD quality assessment report, the uncertainty via a range:

$$[nR, (n+1)R-1],$$

Where the reporting resolution is R={5, 10, 20, 30} meters, and n is an index to indicate the value range within which the RSTD uncertainty is estimated to be.

Problems with the Existing Solution

The accuracy of the position estimation depends significantly on the quality and accuracy of the measured RSTDs sent from the UE to the E-SMLC.

Need for Finer RSTD Measurement Reporting Resolution

There are several indications that current UE receiver implementations can estimate the RSTD at a finer resolution than the current RSTD measurement reporting resolution of 1 $T_s$, which corresponds to 9.8 meters. For example, baseline evaluations indicate that performance is much restricted by the RSTD quantization resolution. Furthermore, there are also academic results available showing that the Cramer-Rao Lower bound for timing estimation based on LTE PRS signals, as well as estimators almost attaining the bound, are well below the RSTD resolution for intermediate to good radio conditions, e.g. in terms of Signal-To-Noise-Ratios (SNRs).

In contributions to RAN1 #80, there were proposals to widen the bandwidth of the Positioning Reference Signal to 20 MHz. That would provide more positioning symbols within each sub-frame, and thereby enable better time synchronization performance. Moreover, also the current mapping of the PRS sequence on time/frequency resource elements causes some auto-correlation issues that can lead to time synchronization errors with some receiver implementations. This is also addressed as a potential area for improvements. In theory, these improvements can provide significant benefits. However, these benefits may be completely suppressed by the RSTD measurement reporting limitations.

SUMMARY

An object may be to improve accuracy of positioning of a user equipment, wherein the positioning is based on measurement reports, such as the above mentioned RTSD measurement report. In particular, an object may be to efficiently increase resolution of measurement reports, such as the RSTD measurement report.

According to an aspect, the object may be achieved by a method, performed by a user equipment, for managing a measurement report relating to measured time of arrival of signals for determining a position of the user equipment.

According to another aspect, the object may be achieved by a method, performed by a location server, for managing the measurement report.

According to another aspect, the object may be achieved by a user equipment for managing the measurement report.

According to another aspect, the object may be achieved by a location server for managing the measurement report.

According to further aspects, the object may be achieved by computer programs and carriers for computer programs corresponding to the aspects above.

The measurement report may indicate difference in the measured time of arrival of signals for determining a position of the user equipment, i.e. the measurement report may be an RSTD measurement report.

According to an aspect of exemplary embodiments herein, there is provided a method performed by a user equipment (UE), the method comprising:

receiving from a location server NetWork assisted Reference Signal Time Difference, RSTD, Quantization Information, NW-QI;

performing RSTD measurements by measuring or estimating a Time Of Arrival, TOA, of a Positioning Reference Signal, PRS, from respective base station of a plurality of base stations;

encoding the RSTD measurements by employing a Enhanced RSTD Quantization Method, E-QM, or by using the NW-QI while encoding the RSTD measurements; and sending UE assisted RSTD Quantization Information, UE-QI, to the location server, the UE-QI including the encoded RSTD measurements.

According to another aspect of exemplary embodiments herein, there is provided a UE comprising a processor and a memory, said memory containing instructions executable by said processor whereby said UE is operative to:

receive from a location server (120), NetWork assisted Reference Signal Time Difference, RSTD, Quantization Information, NW-QI;

perform RSTD measurements by measuring or estimating a Time Of Arrival, TOA, of a Positioning Reference Signal, PRS, from respective base station of a plurality of base stations;

encode the RSTD measurements by employing a Enhanced RSTD Quantization Method, E-QM, or by using the NW-QI while encoding the RSTD measurements; and send UE assisted RSTD Quantization Information, UE-QI, to the location server, the UE-QI including the encoded RSTD measurements.

According to a further aspect of embodiments herein, there is provided a computer program comprising computer readable code which when run in the UE e.g. by means of the processor causes the UE to perform anyone of the subject-matter of appended method claims 1-8.

According to yet another aspect of exemplary embodiments herein, there is provided a method performed by a location server, the method comprising:

transmitting NetWork assisted Reference Signal Time Difference, RSTD, Quantization Information, NW-QI, to a User Equipment, UE.

receiving UE assisted RSTD Quantization Information, UE-QI, from the UE, including encoded RSTD measurements and further receiving RSTD measurements quality assessment report from the UE;

decoding the RSTD quantized measurements using the UE-QI and/or the NW; and estimating position of the UE (110) based on the decoded RSTD quantized measurements.

According to yet another aspect of exemplary embodiments herein, there is provided a location server comprising a processor and a memory, said memory containing instructions executable by said processor whereby said location server is operative to:

transmit NetWork assisted Reference Signal Time Difference, RSTD, Quantization Information, NW-QI, to a User Equipment, UE.

receive UE assisted RSTD Quantization Information, UE-QI, from the UE, including encoded RSTD measurements and further receiving RSTD measurements quality assessment report from the UE;

decode the RSTD quantized measurements using the UE-QI and/or the NW; and estimate a position of the UE based on the decoded RSTD quantized measurements.

In one exemplary embodiment, the user equipment transforms RSTD measurements, e.g. by subtracting an offset from each RSTD measurement. Moreover, the user equipment groups the RSTD measurements, either before or after transformation thereof, into a plurality of groups of RSTD measurements. RSTD measurements within one group may be correlated with respect to a property, such as similar absolute values of the RSTD measurements. Then, the user equipment selects, based on the property of the RSTD measurements in each group, a respective quantization function for each group. For example, a quantization function based on difference of RSTD measurements may be used when many RSTD measurements, transformed or non-transformed RSTD measurements, have similar or equal values.

According to yet another aspect of exemplary embodiments herein, there is provided a computer program comprising computer readable code which when run in the location server e.g. by means of the processor causes the location server to perform anyone of the subject-matter of appended method claims 14-16.

In this manner, the embodiments herein efficiently quantize RSTD measurements. A method according embodiments is based on quantization, e.g. dynamic quantization, that has various degrees of freedom to be optimized, under different scenarios and settings. The quantization may be supported by signaling (NW-QI) from the location server, e.g. E-SMLC, to the UE as well as signaling (UE-QI) from the UE to the location server, which may be required for decoding RSTD quantized reports at the location server.

The proposed solution improves efficiency of the quantization of RSTD measurements. The solution may have one or more of the following ingredients:

1—Optional: Network Assisted RSTD Quantization Information (NW-QI): This refers to any information that is provided by the location server (E-SMLC) to a UE that can be used to perform enhanced/quantization.

2—Optional: UE Assisted RSTD Quantization Information (UE-QI): This refers to any information related to an enhanced RSTD quantization that is provided by the UE to the location server (E-SMLC). This information is useful and/or necessary for decoding Quantized RSTD measurement reports at E-SMLC.

3—Enhanced RSTD Quantization function (E-QM): This refers to an enhanced quantization method/protocol/procedure employed at the UE to quantize RSTD measurement reports. E-QM can be designed under one of the following four assumptions:
  i. None of them is available, since both are optional
  ii. NW-QI is available
  iii. UE-NW is available
  iv. Both NW-QI and UE-QI are available The solutions herein include an efficient design for RSTD quantization, which referred to as E-QM, whereas signaling of NW-QI and UE-QI are optional that may exist to support certain embodiments of the E-QM.

The efficiency of a quantization method is measured based on the number of bits needed to encode RSTD measurements for a given quantization error. An efficient solution would lead to fewer bit representation of RSTD measurements while achieving the same quantization error. A solution can be efficient in all occasions or a weaker notion of efficiency would be that it is efficient on average. When efficiency is compared between two quantization protocols, the resources (bits) spent on additional information exchange to support quantization should be considered.

An advantage with the proposed solution is that it provides a general protocol for efficiently quantizing RSTD measurements.

In most cases, little additional signaling can significantly increase the efficiency of RSTD quantization Finally, the efficient RSTD quantization will provide possibility for improved positioning accuracy.

The currently specified 3GPP quantization method is not designed while keeping in mind the above mentioned different types of information and thus is inefficient. The proposed quantization protocol can serve as a basis for devising improved RSTD quantization methods in 3GPP.

BRIEF DESCRIPTION OF THE DRAWINGS

The various aspects of embodiments disclosed herein, including particular features and advantages thereof, will be readily understood from the following detailed description and the accompanying drawings, in which

FIG. 1 depicts an example of a LTE positioning architecture

FIG. 2 depicts OTDOA position estimation based on multi-lateration of the RSTD measurements.

FIG. 3 depicts and exemplifying wireless communication network in which embodiments herein may be implemented.

FIG. 4 illustrates an exemplifying method according to embodiments herein.

FIG. 5 shows a combined signaling and flowchart illustrating an overall structure of the embodiments herein.

FIG. 6 illustrates embodiments of a method performed by a UE.

FIG. 7 shows embodiments performed by a location server.

FIG. 8 illustrates embodiments of a method performed by the location server.

FIG. 9 depicts the Enhanced Quantization Method (E-QM).

FIG. 10 depicts an embodiment based on LPP signalling additions in the case the location server initiates the positioning.

FIG. 11 illustrates an embodiment based on LPP signalling additions in the case the device or UE initiates the positioning.

FIG. 12 illustrates an exemplary block diagrams showing a UE, a carrier and a computer program respectively.

FIG. 13 illustrates an exemplary block diagrams showing a location server, a carrier and a computer program respectively.

FIG. 14 illustrates an exemplifying method performed by a UE and a location server.

DETAILED DESCRIPTION

Figure 1:
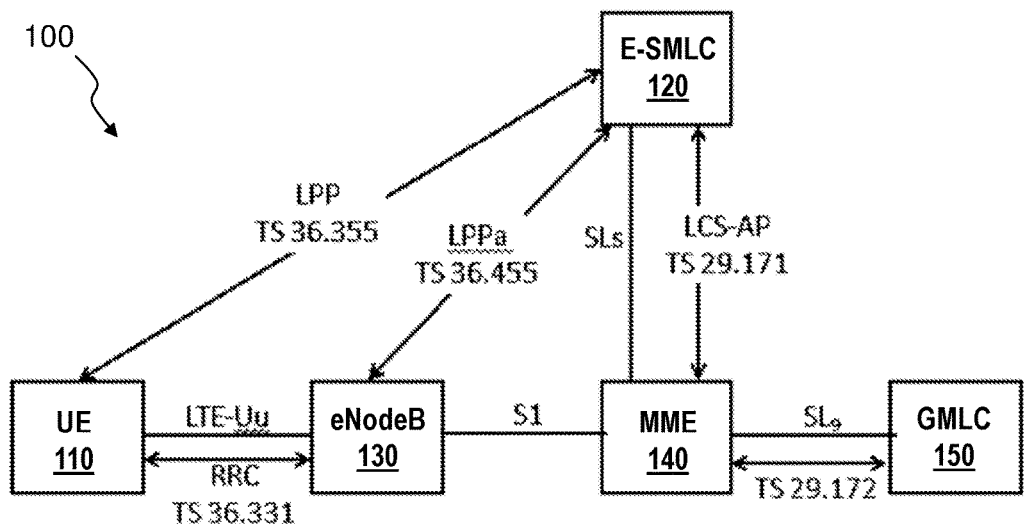
FIGS. 1-14 are provided.
Figure 2:
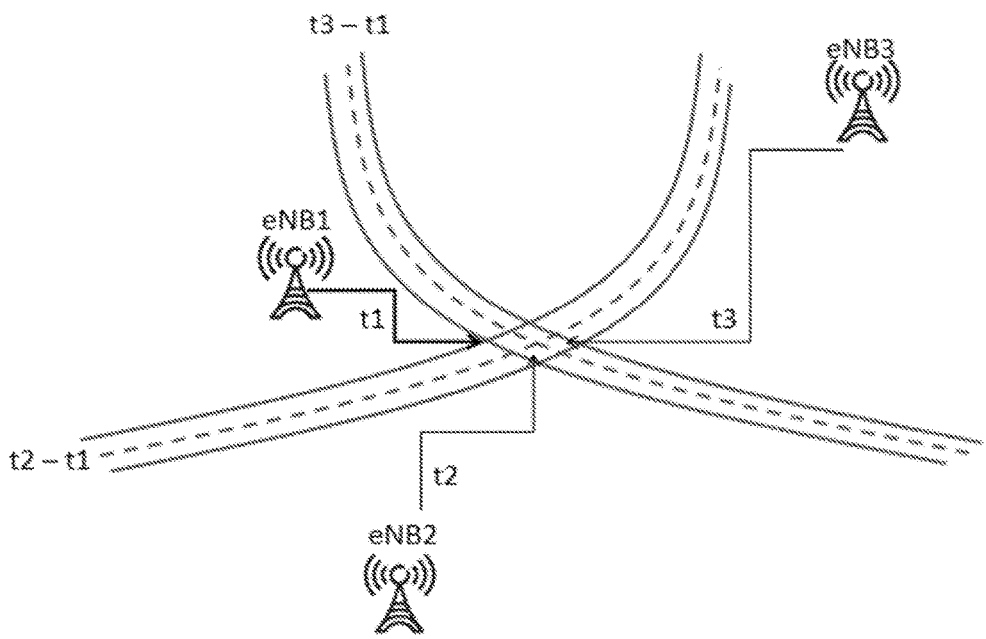

Throughout the following description similar reference numerals have been used to denote similar features, such as nodes, actions, steps, modules, circuits, parts, items elements, units or the like, when applicable. In the Figures, features that appear in some embodiments are indicated by dashed lines.

In order to better appreciate the embodiments herein, the following observations are made.

Need for an Efficient Quantization Protocol

As discussed above in section "background", the existing RSTD quantization function has two different resolutions, i.e., resolution equal to 1 $T_s$ for RSTDs within $\pm 4096$ $T_s$, and equal to 5 $T_s$ otherwise (1 $T_s=1/(15000\times 2048)$ sec is the LTE basic time unit). This is a scalar quantization function which is simple to implement, but it can be very inefficient. Some of the causes of its inefficiency are listed below:

The resolution of the scalar quantization function only depends on the RSTD measured value The range of the scalar quantization function can be inappropriate in certain scenarios, e.g., indoor cell deployments, leading to inefficient utilization of quantization range.

The scalar quantization function is single input single output, i.e., it treats each RSTD separately. It cannot gain benefit from correlation and structural properties of RSTD measurements.

Need for Improved RSTD Quality Assessment Report:

The UE reports the quality of the RSTD measurement, and hence an improved RSTD quality report is beneficial and eventually leads to better position estimation.

Figure 3:
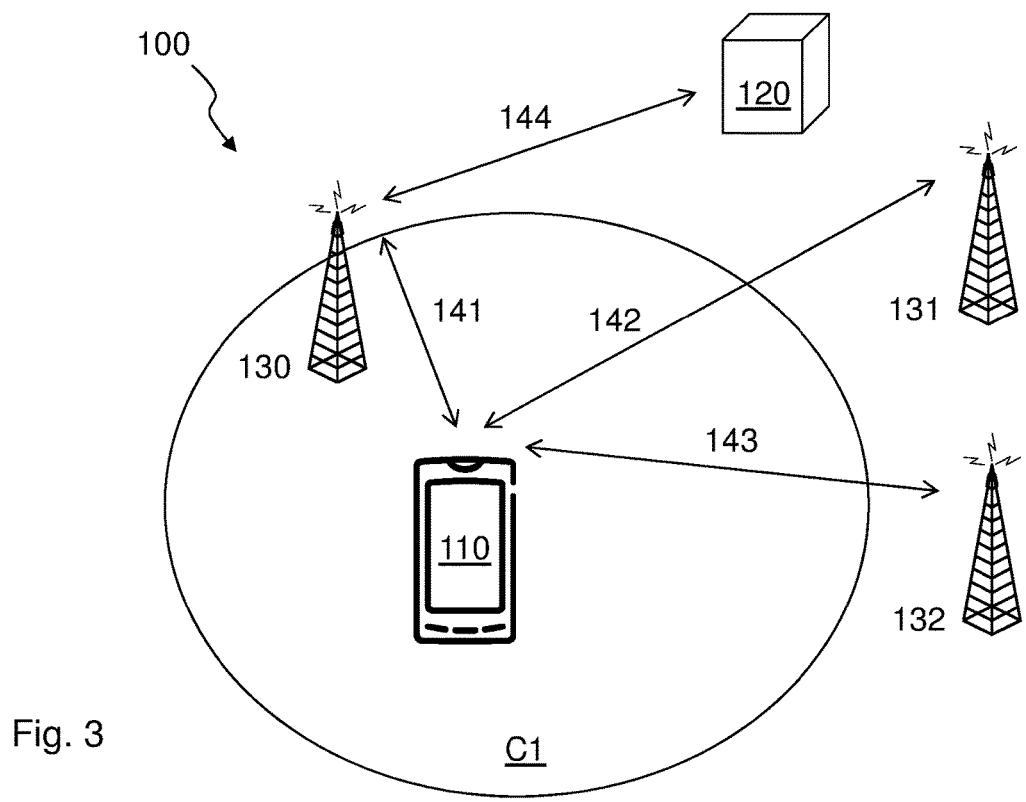

FIG. 3 depicts an exemplifying wireless communication network 100, in which embodiments herein may be implemented.

In this example, the wireless communication network 100 is a Long Term Evolution (LTE) network. In other examples, the wireless communication network 100 may be any cellular or wireless communication system, such as a Global System for Mobile Communications (GSM), Universal Mobile Telecommunication System (UMTS) and Worldwide Interoperability for Microwave Access (WiMAX) or any other Third Generation Partnership Project (3GPP) communication network existing or future evolutions, or the like.

A user equipment 110 may be located in a cell C1, which is operated by a radio network node 130. The radio network node 130 serves the user equipment 110 by operating the cell C1. This may mean that the first user equipment 110 is connected, such as in RRC_CONNECTED mode, while using LTE terminology. The wireless communication network comprises the radio network node 130.

FIG. 3 also illustrates a further radio network node 131 and a still further radio network node 132. The user equipment 110 may perform TOA measurements 141, 142, 143 towards one or more of the radio network node 130, the further radio network node 131 and the still further radio network node 132.

The wireless communication network 100 further comprises a location server 120, such E-SMLC, GMLC or the like. The radio network node 130 may communicate 144, such as over LPP in case of an LTE network, with the location server 120.

As used herein, the term "radio network node" may refer to an evolved Node B (eNB), a Radio Network Controller (RNC), a Radio Base Station (RBS), a control node controlling one or more Remote Radio Units (RRUs), an access point, a base station or the like.

As used herein, the term "user equipment" may refer to a wireless device, a wireless communication device, a machine-to-machine (M2M) device, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor may be any kind of weather sensor, such as wind, temperature, air pressure, humidity etc. As further examples, the sensor may be a light sensor, an electronic or electric switch, a microphone, a loudspeaker, a camera sensor etc. The term "user" may indirectly refer to the wireless device. Sometimes, the term "user" may be used to refer to the user equipment or the like as above. It shall be understood that the user may not necessarily involve a human user. The term "user" may also refer to a machine, a software component or the like using certain functions, methods and similar.

The embodiments herein relate to Observed Time Difference of Arrival, Reference Signal Time Difference, Indoor Positioning, RSTD Quantization.

Figure 4:
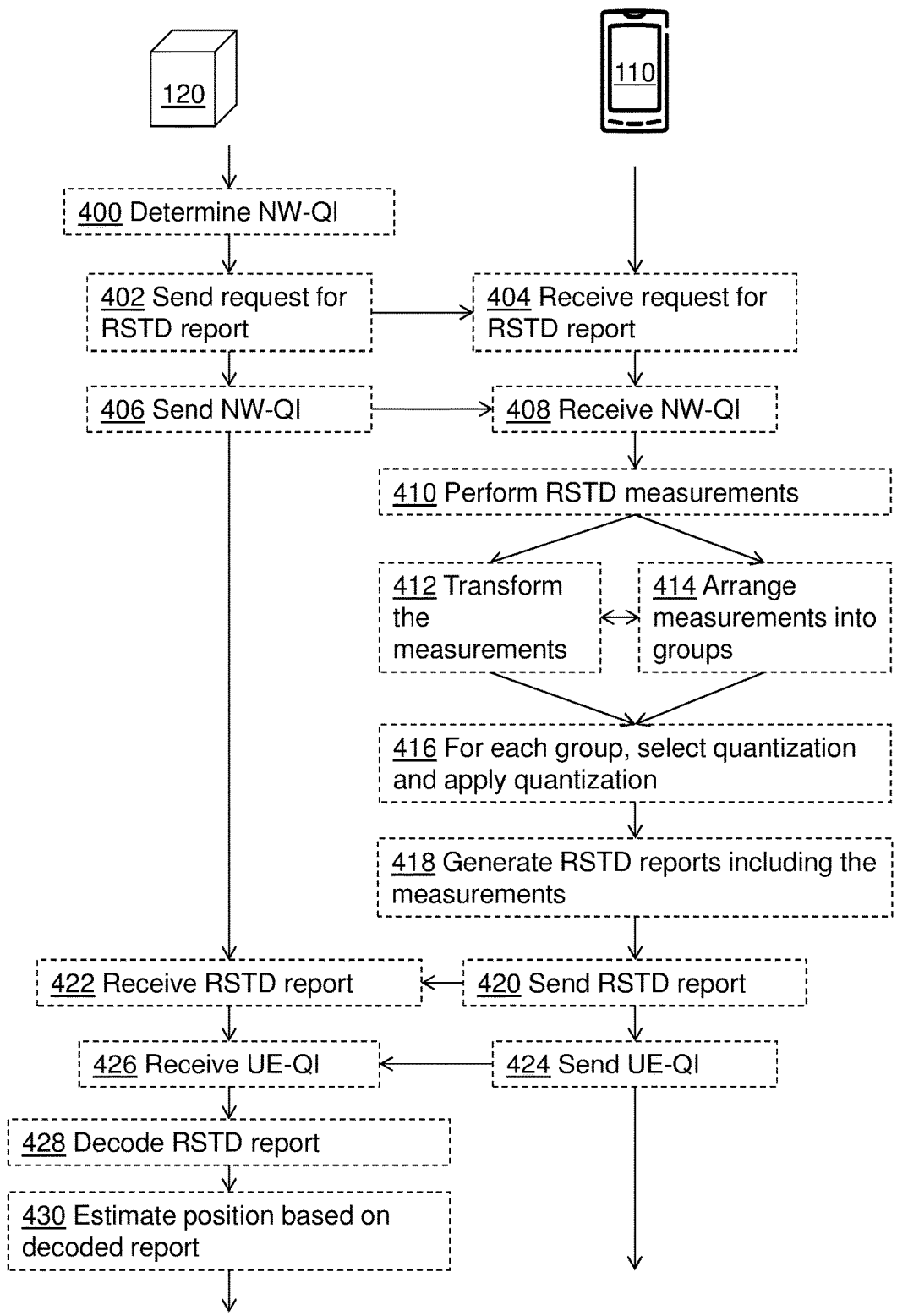

FIG. 4 illustrates an exemplifying method according to embodiments herein when performed in connection with the wireless communication network 100 of FIG. 3.

The user equipment 110 may perform a method for managing a measurement report.

The location server 120 may perform a method for managing a measurement report.

In the following examples, the measurement report is a RSTD measurement report

One or more of the following actions may be performed in any suitable order.

Action 400

The location server 120 may determine NW-QI. For example, the location server 120 may determine the NW-QI based on historical data such as previously received RSTD reports, including RSTD measurement and RSTD measurement quality assessment, from the UE, and the previous location estimates or based on the rough estimate of the location of the UE, e.g., if it is indoor or outdoor or in the coverage of small cells etc.

NW-QI may comprise one or more of:
- An indication to perform a certain transformation function, e.g. offset to subtract from measurements when transforming measurements in action 412. For example, the set of possible transformations can be fixed and known to both user equipment 110 and the location server 120. The server can indicate an index in that set, corresponding to a certain transformation function.
- one or more rules for arrangement of measurements into groups, the rule may define groups of measurements, e.g. a group may be identified by a type of base station towards which the user performs measurements, e.g. macro or micro base station, and quantization function associated to the group, and the like as disclosed herein,
- one or more indications relating to a respective quantization function to be used in action 416, the indication may be associated to a certain transformation function and/or a specific group of measurements.

Action 402

The location server 120 sends, to the user equipment 110, a request for RSTD measurement reports. In this manner, the location server 120 prompts the user equipment 110 for location information, e.g. RSTD measurement report(s). The request may indicate, e.g. by means of CellID, identity of radio network node or the like, towards which radio network nodes the user equipment 110 may perform measurements.

Action 404

The user equipment 110 receives, from the location server 120, the request for RSTD measurement reports.

Action 406

When action 400 has been performed, the location server 120 may send NW-QI to the user equipment 110. In this manner, the user equipment 110 is informed about the NW-QI that the location server may apply when decoding RSTD measurement reports. Additionally, the user equipment 110 may use the NW-QI in one or more of actions 412, 414 and 416.

Action 408

The user equipment 110 receives, from the location server 120, the NW-QI.

Action 410

In response to action 404, the user equipment 110 may perform TOA measurements, e.g. to obtain RSTD measurements.

Action 412

The user equipment 110 transforms the TOA measurements. The user equipment 110 may transform the TOA measurements based on NW-QI. For example, when the NW-QI comprises an offset for transformation of the TOA measurements, the user equipment 110 may transform the TOA measurements by subtracting the offset therefrom. Sometimes, the NW-QI may indicate a transformation function, which of course may include the offset. See also section "Transform RSTD measurements", in which further examples are described.

Action 414

The user equipment 110 arranges the measurements into groups. The user equipment 110 may arrange the measurements into groups based on absolute values of the measurements, relative values of the measurements and the like. In other examples, the user equipment 110 may arrange the measurements into groups according to a rule provided in the NW-QI. See also section "grouping of RSTD measurements".

In this example, action 412 is performed before action 414. In other examples, action 414 may be performed before action 412.

Action 416

For each group, the user equipment 110 selects a quantization function, or a quantization rule. The quantization function may be that the measurements are linearly quantized while using a specific quantization resolution and/or quantization range. The quantization resolution refers to number of bits used for representing the quantized measurements.

In this action, the user equipment 110 also quantizes, for each group, the transformed measurements while using the selected quantization function.

In some examples, only action 416 among action 412, 414 and 416 is performed. Typically, this may be the case where no suitable transformation and grouping is found, but a quantization function may nevertheless be adapted to the RSTD measurements. This may for example be appropriate when the TOA measurements may be approximated by a polynomial function, e.g. $y=ax^2+bx+c$ or the like. In this case, the UE-QI may include information about a portion of the polynomial function for which the approximation is valid and information about values of a, b and c. It may also be that one or more of a, b and c is predefined and thus only one or more of a, b and c needs to be included in the UE-QI. The portion of the polynomial function may thus be a range, or interval, over which the indices of quantized values extend. In this manner, a dynamic selection of the quantization function, based on the TOA measurements, is performed.

In some examples, only one of action 412 and 414 is performed in combination with action 416. Similarly, to the previous example, this may be the case where no suitable transformation or no suitable grouping is found, but a quantization function may nevertheless be adapted to the RSTD measurements and the transformation, i.e. the transformed RSTD measurements, or the grouping. It may be noted that action 412 may be included in action 416 when action 414 is performed before action 412.

Action 418

Now that the measurements have been processed in action 412, 414 and 416, the user equipment 110 generates RSTD reports including the RSTD quantized measurements and RSTD measurements quality assessment Action 420

The user equipment 110 may send, to the location server 120, the RSTD measurement reports, generated in action 418.

Action 422

The location server 120 may receive the RSTD measurement reports from the user equipment 110.

Action 424

This action is typically performed when action 412 and/or Action 414 and/or Action 060 uses information that the location server 120 is not already aware of. In this action, the user equipment 110 may send UE-QI to the location server. The UE-QI may comprise information relating to the transformation, the arranging into groups and/or the quantization function.

The UE-QI may comprise one or more of:
a transformation function, e.g. offset to subtract from measurements when transforming measurements in action 412
one or more rules for arrangement of measurements into groups, the rule may define groups of measurements, e.g. a group may be identified by a type of base station towards which the user performs measurements, e.g. macro or micro base station, and quantization function associated to the group, and the like as disclosed herein,
one or more indications relating to a respective quantization function to be used in action 416, the indication may be associated to a certain transformation function and/or a specific group of measurements.

Action 426

Subsequent to action 424, the location server 120 may receive the UE-QI from the user equipment 110.

Action 428

The location server 120 may decode the RSTD measurement report to obtain the measurements, such as TOA measurements. The location server 120 may decode the RSTD measurement report by use of the UE-QI, if received in action 426. Moreover, the location server 120 may decode the RSTD measurement report by use of the NW-QI sent to the user equipment 110 in action 406.

In this action, the location server 120 may find a group based on NW-QI, UE-QI or common information (see below). For each group, the location server 120 may de-quantize quantized measurements of the measurement report by reversely applying a respective quantization function, wherein the quantization function may have been selected by the location server 120 based on NW-QI, UE-QI or common information (see below). Moreover, the location server 120 may re-transform de-quantized measurements by reversely applying a transformation function, wherein the transformation function may have been selected by the location server 120 base on NW-QI, UE-QI or the common information.

Action 430

The location server 120 may estimate a position of the user equipment 110 based on the measurements obtained from the RSTD measurement report in action 428.

The estimation of the position may be according to prior art methods, such as OTDOA or the like. The accuracy of the estimated position may be improved thanks to that the measurements are provided, by the user equipment 110, at a higher accuracy as compared to in prior art methods. Notably, prior art methods use a static, i.e. fixed, quantization function irrespectively of values of measurements, the accuracy of the method used in estimating TOA (or RSTD), and the cell deployment scenario. It is only a resolution of the quantization function that is varied between two different resolution values depending on absolute values of the measurements. A lower resolution is chosen for smaller RSTD measurements and vice versa.

As explained above, and further elaborated below, selection of one or more of:
one or more transformation functions, e.g. one transformation function for all measurements or a respective transformation function for each identified group,
one or more rules for arrangement into groups,
one or more quantization functions,
is based on one or more of:
common information, i.e. information that is common to the UE 110 and the location server 120,
NW-QI, and
UE-QI.

The common information may comprise:
CellID of base stations from which the UE 110 receives and measures PRS or the like,
UE implementation/capability specific information
The information that is already exchanged between the UE and the server, e.g., measurement quality assessment report
The information that is optionally exchanged for other purposes, e.g., indications for reference cell and neighbor cell selection policy, expected RSTD values, from the location server to the UE,
etc.

The NW-QI may comprise an indication related to what transformation, grouping, selection of quantization function can be beneficial. The location server can generate NW-QI based on previously received RSTD measurements, the previously known UE location, mobility, and the associated cell deployment scenario, network synchronization error, and capability of the position estimation algorithm employed at the location server.

This means for example that the NW-QI may comprise information that is known locally to the location server 120, i.e. information not available to the UE 110, such listed above.

The UE-QI comprises of additional information that is necessary for decoding RSTD measurement reports, e.g., an indication of what grouping, transformation, quantization functions, were employed at the UE (if the location server does not have this information via other means). This information has to be communicated efficiently using as few resources as possible. In a case that transformation, grouping, selection of quantization functions indicated by the location server are used by the UE, then the UE can indicate it via UE-QI.

This means for example that the UE-QI may comprise information that is known locally to the UE 110, i.e. information not available to the location server 120, such listed above.

In case, the arrangement into groups in action 414 has been performed based on transformed TOA measurements, the UE-QI may comprise information enabling identification of those groups. Unless the location server 120 is already aware of which transformation to use, e.g. by pre-configuration or the like, the UE-QI may include a transformation function to be applied for all de-quantized values, which may have been de-quantized using different quantization functions.

The protocol has a number of degrees of freedom that can be optimized to enhance the performance. In particular, the protocol makes use of different types of information such as one or more of:

1. information that is common to the location server and the UE;
2. scenario specific information that can be estimated by the UE and indicated (by means of UE-QI) to the location server;
3. UE implementation/capability specific information;
4. scenario specific information that can be estimated by the location server and indicated (by means of NW-QI) to UE;
5. additional information that is provided to UE from the location server (NW-QI); and
6. additional information that is provided to the location server from the UE (UE-QI).

Figure 5:
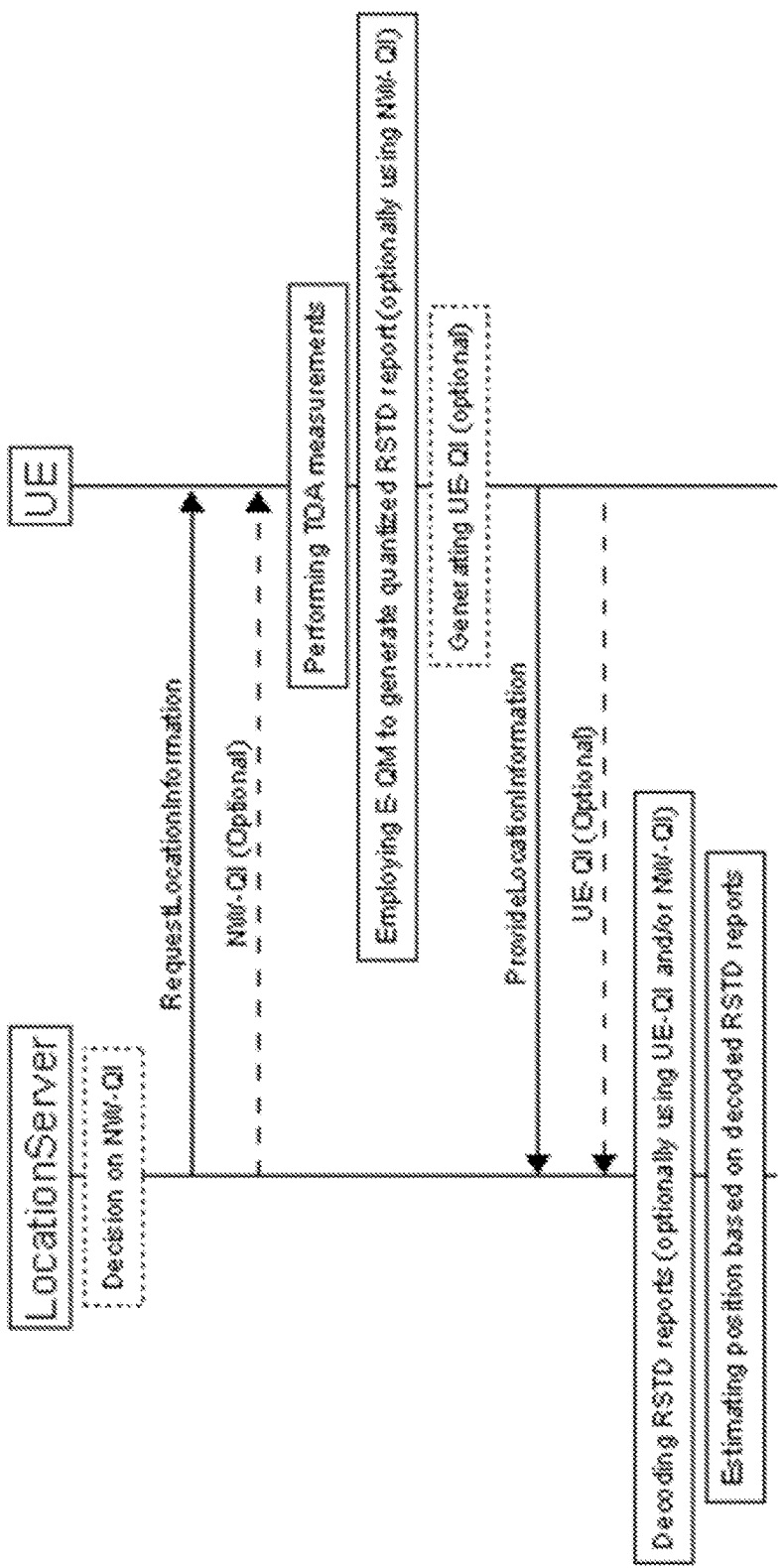

The overall procedure is summarized in FIG. 5. FIG. 5 is a combined signaling and flowchart illustrating an overall structure of the embodiments herein.

Figure 6:
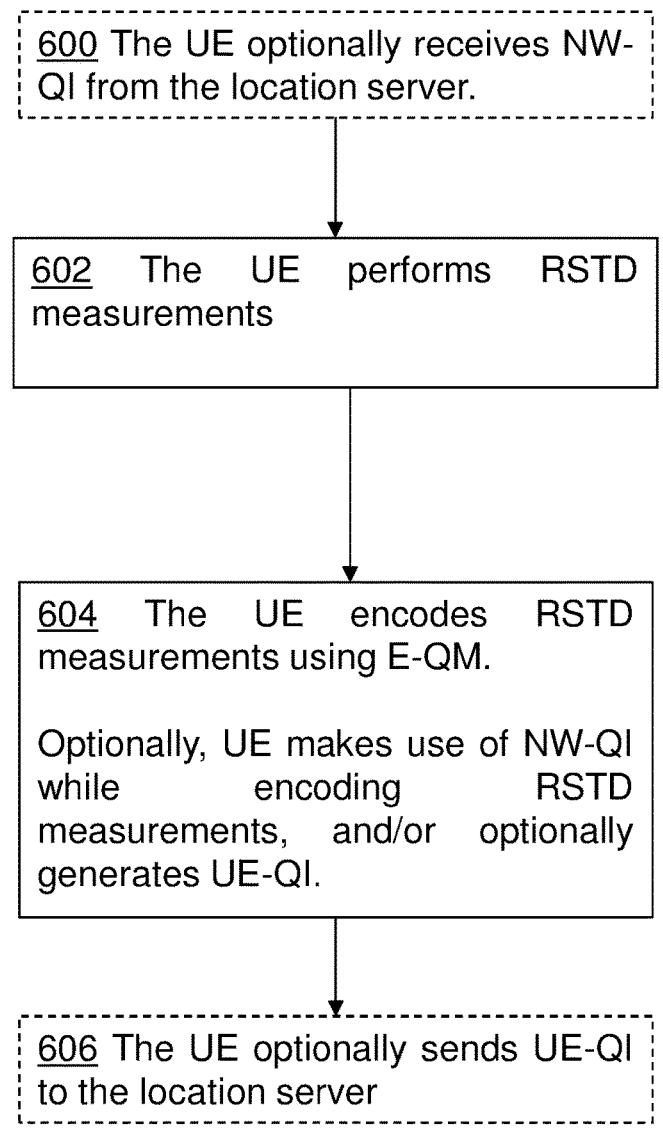

The Proposed RSTD Encoding and Decoding Procedure:
FIG. 6 illustrates embodiments of a method performed by a UE. In one exemplifying embodiment, the user equipment may perform the following actions according to the method described below.

Step 600: The UE optionally receives from the location server (E-SMLC), the Network Assisted RSTD Quantization Information (NW-QI). See also action 408 above.

Step 602: The UE performs RSTD measurements. This step may include performing TOA measurements for three or more cells/base stations. The RSTD measurement may be derived from the TOA measurements. See also action 410 above.

Step 604: The UE employs Enhanced RSTD Quantization Method (E-QM). Optionally, the UE can make use of NW-QI while using an E-QM. Optionally, the UE can generate additional information (UE-QI) that is necessary for decoding quantized RSTD measurement reports at the location server. See actions 412, 414 and 416 above.

Step 606: Optionally, the UE sends UE Assisted RSTD Quantization Information (UE-QI) to the location server (E-SMLC). This step may further include an additional step in which the UE sends RSTD measurement report generated in step 604. In this example, the additional step is included in step 606. In other examples, the additional step may be excluded, e.g. separated, from step 606. See also action 424 above.

This means that the UE, or wireless communication device, performs a method for managing RSTD measurement reports, in which the user equipment encodes, e.g. quantizes, measurements for positioning.

Figure 7:
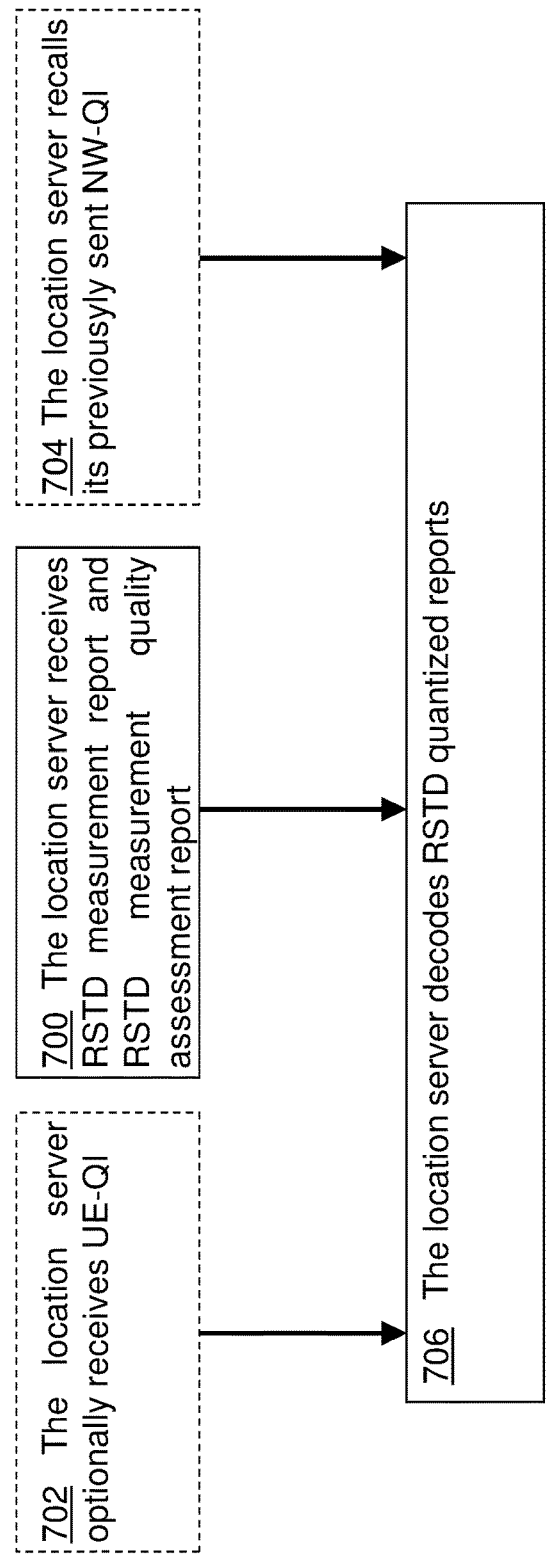

FIG. 7 shows embodiments performed by a location server. Based on (E-QM, NW-QI, UE-QI), the proposed decoding at the location server works as follows:

Step 700: The location server (E-SMLC) receives the RSTD quantized reports and the RSTD measurement quality assessment report. See also action 422. Optionally step 702, the location server receives UE-QI. Optionally step 704, the location server has access to, i.e. recalls, NW-QI that was signaled it to the UE previously.

Step 706: The location server (E-SMLC) decodes RSTD quantization reports. The decoded RSTD measurements are then used to estimate position of the UE. See also action 428.

This means that the location server, or a network node, performs a method for managing RSTD measurement reports, in which the location server decodes the RSTD measurement report to obtain measurements to be used when estimating a position of the user equipment 110.

Figure 8:
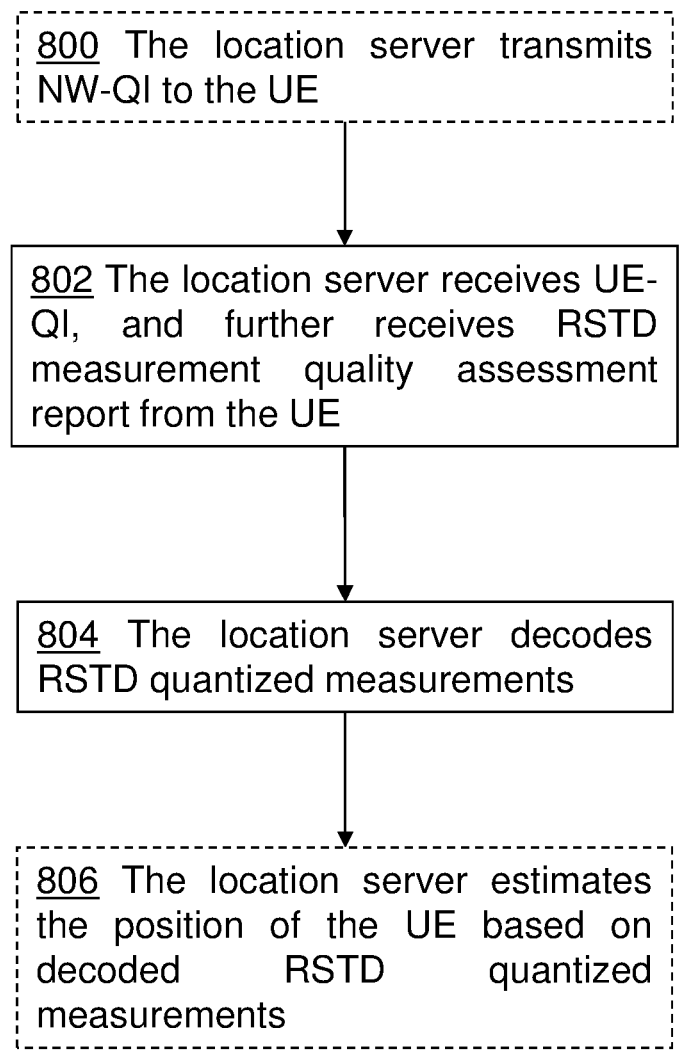

FIG. 8 illustrates a method performed by the location server according to embodiments herein. The method comprises:

Step 800: The location server transmits NW-QI to the UE;

Step 802: The location server receives UE-QI and further receives RSTD measurement quality assessment report from the UE Step 804: The location server decodes RSTD quantized measurements.

Step 806: The location server estimates the position of the UE based on decoded RSTD quantized measurements.

The Enhanced Quantization Method (E-QM)

Figure 9:
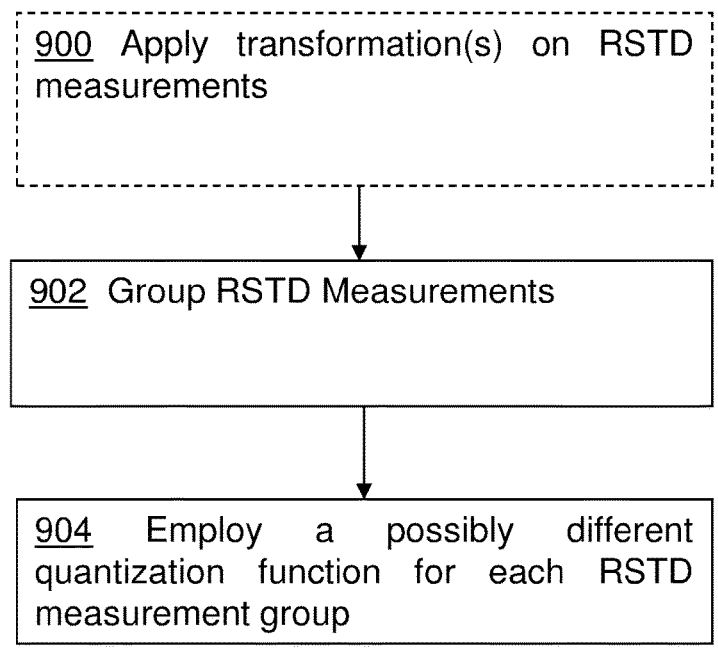

FIG. 9 depicts the Enhanced Quantization Method (E-QM). In section "RSTD measurement reporting, it is discussed that the quantization function specified in 3GPP specification has two different resolutions, i.e., resolution equal to 1 $T_s$ for RSTDs within ±4096 $T_s$, and equal to 5 $T_s$ otherwise (1 $T_s$=1/(15000×2048) sec is the LTE basic time unit). Moreover, is has been identified that this quantization is inefficient due to multiple reasons. Keeping in mind the causes of its inefficiency, an Enhanced Quantization Method (E-QM) is devised. The input to E-QM is a set of K RSTD measurements and the output is a set of quantized RSTD values. The Enhanced Quantization Method (E-QM) of FIG. 9 has three steps (also illustrated in FIG. 11).

Step 900: Transform RSTD measurements: Apply one or more transformations to one or more RSTD measurements.

Step 902: Grouping of RSTD measurements: Sort the transformed RSTD measurements into one or more groups according to one or more criteria such that each RSTD measurement is included in one and only one group. If there are K RSTD measurements, then the number of groups can be between 1 and K.

Step 904: Employ a possibly different quantization function for each group: For each group, select a quantization function. For a group that contains two or more RSTD measurements, the quantization function can be multiple input single out-put.

E-QM has a generalized structure with several degrees of freedom to optimize its efficiency. Recalling that the efficiency of a quantization method is measured based on the number of bits needed to encode RSTD measurements for a given quantization error, a quantization method is implemented, while taking into account the additional bits used for signaling supporting information, such NW-QI and UE-QI.

In the following, there is presented several embodiments on how the transformations, grouping, and the quantization functions can be beneficial.

Transform RSTD Measurements, Details of Action 412

In one embodiment (transformation embodiment 1) the transformation step can be to subtract a constant (offset) value from RSTD measurements to reduce the absolute values of the RSTD measurements. Then, apply quantization function(s) with smaller quantization range. The offset value can be signaled via UE-QI to E-SMLC. The number of possible offsets can be pre-configured at the UE. If there are several RSTD measurements, the gain from reducing range could be much higher than the loss due to additional UE-QI. An exemplifying transformation function, TF, may be TF(x)=x−y_offset, where x is a measured TOA value and y_offset is an offset to be applied, e.g. to all or a group of measurements.

In another embodiment for transformation (transformation embodiment 2), in cases where there are some RSTD measurements that have large absolute values. One approach could be to quantize relative differences, which may still be significantly small thus leading to sufficiency of a reduced (small) quantization range. One way to avoid error propagation in this method is to quantize one RSTD separately, and then compute relative differences of a first quantized measurement with the other (un-quantized) RSTD measurements. The first quantized measurement may have a quantization error. With the relative difference taken relatively the first quantized measurement, it will be ensured that the quantization error of the first measurement, does not propagate to other quantified measurements. A reason for this is that a second quantization error of a second quantized measurement, taken as the difference relatively the first quantized measurement, is independent of the quantization error of the first quantized measurement. In this example, the transformation function is based on the values of the RSTD measurements. The user equipment 110 may signal, to the location server, information about a transformation function used, e.g. in the UE-QI.

In transformation embodiment 2, the UE does not have to inform the location server about the offset value, since the location server 120 will get to know first RSTD measurement.

In the transformation embodiment 1, the offset value has to be indicated to the location server, e.g. by means of UE-QI. For example, there may be 4 possible offsets pre-configured at the UE according to specifications and then if UE chooses one of those 4 possible offsets, it should inform to the location server about which one was used when transforming.

Moreover, as already mentioned, different offsets may be applied to different groups. Also with the transformation embodiment 2, there may be different groups of RSTD measurements. The location server 120 may have determined the grouping and informed the UE 110 about the grouping using the NW-QI. In this case, the UE 110 does not send the UE-QI. In other examples, the grouping may be known to the location server 120 thanks to other information, such as CellID or the like. Furthermore, in some cases, the UE 110 may be autonomously determined the grouping and informs the location server 120 thereof using the UE-QI.

In another embodiment for transformation, an analog compression (possibly non-invertible) to reduce the range of RSTD measurements can be applied. The compression function can be chosen such that it is invertible under a known parameter. For example, choose a saw-tooth function as an analog compressor, where the period of the saw-tooth function corresponds to a known parameter. Compress the measurements according to the saw-tooth function and then quantize the transformed RSTD measurements. Additionally, signal the time period of the saw-tooth function such that the mapping is invertible. The number of possibilities for selecting a period of a saw-tooth function can be pre-specified in the UE.

Grouping of RSTD Measurements, Details of Action 414

In one embodiment for grouping step, consider that a UE can identify two separate RSTD measurements groups; first group with high RSTD measured values and second group with low RSTD measured values. The UE can assign a large quantization range to the first group and a small quantization range to the second group. Let's say the first group has elements indexed $\{1, 2, \ldots, m\}$ and second group has elements indexed $\{m+1, m+2, \ldots, K\}$. Then the UE can signal, as part of UE-QI, the index m, which will enable the location server to correctly decode the RSTD measurement reports. The number of bits spent on binary representation of 'm' can be much lower than the number of bits saved by reducing quantization range for the second group of RSTD measurements, e.g., if m is small and K is large.

In another embodiment for grouping, consider that a UE has selected small cells as well as Macro cells. Assume that the reference cell is a small cell. Then the values of RSTD measurements associated with small cells can be much smaller compared to the RSTD measurements associated with the Macro cells. The UE can group RSTD measurements for small and Macro cells separately and use two different quantization functions for two different groups. Since the server knows that the reference cell is a small cell and the RSTD measurement reports of which cells correspond to small cells and which reports correspond to Macro cell, it can decode the RSTD measurement reports without requiring any additional signaling. Such quantization functions can be pre-configured in the UE according to specifications.

In another embodiment for grouping, consider a vector quantization which is a multiple input single output function. According to rate distortion theory, the lower bound on distortion can be achieved through vector quantization. In general vector quantization offers the following three main advantages: i) space-filling advantage, ii) memory advantage, iii) shape advantage. One way to implement a vector quantization function is that one allocates lower resolution to less likely events and a higher resolution to more likely events. For example, if a UE is in indoor dense cell deployment scenario and the reference cell is indoor, then it is a very rare event that all RSTD measurements are large. Similarly, another rare event is that all RSTD values are very small which corresponds to poor geometry. In general, one can exploit correlation among RSTD measurements through a careful design of vector quantization.

Employ a Possibly Different Quantization Function for Each Group, Action 416

In one embodiment, one can pre-configure different quantization functions at the UE related to different scenarios e.g., indoor/outdoor small/macro cells and/or based on the maximum RSTD measurement and/or based on RSTD measurement quality assessment. For example, the maximum RSTD value can be encoded with a pre-defined quantization function and all the rest can be encoded with a quantization function that is selected based on the maximum RSTD measurement. The decoder at E-SMLC can decode maximum RSTD measurement report via the known quantization function and then recognize the second quantization function that was used to decode rest of the measurements.

In another embodiment, one can define quantization function based on the RSTD measurement quality/uncertainty assessment report. An RSTD measurement that is more uncertain can be given lower resolution while employing quantization and the RSTD assessment report can capture the uncertainty in RSTD measurement as well as the uncertainty due to quantization. The location server will read RSTD quality assessment report and accordingly decode the RSTD measurement reported measurements. In one example, the RSTD quality assessment report may include an indication of whether the quality assessment relates to uncertainty in RSTD measurement or uncertainty due to quantization error or both. In general, RSTD quality assessment report should capture the uncertainty due to quantization error, even when quantization resolution is known at the location server. This is due to that while knowing quantization resolution, the location server may determine a maximum quantization error, but the location server is not aware of further information about magnitude of quantization error (instantaneous quantization error) that was introduced for a particular measurement. The user equipment may thus take into account the magnitude of the quantization error for that particular measurement while determining the RSTD quality assessment report.

In some embodiments, the location server can assess if there is a potential gain in choosing a higher resolution quantization function at the UE. Such an assessment can be made by the location server based on for example network synchronization error.

In some embodiments, the location server can indicate to the UE (via NW-QI) what quantization range is reasonable, based on the previously received RSTD values and/or estimated positions. Here, the location server has an incentive to follow a zoom in/out approach such that if a UE has low mobility the subsequent quantization functions can zoom-in to provide improved quantization resolution and thus a possibility for improved positioning accuracy.

In a general embodiment, a UE can determine if it has implemented a more accurate method to provide higher TOA accuracy and thus decide if a higher quantization resolution is needed or not.

In some embodiments, the location server can indicate via NW-QI which resolution and/range should be selected. It may happen that the UE finds out that the indication from NW-QI wasn't appropriate, for example if maximum absolute value of RSTD measurements is beyond the server provided range, then it may choose another pre-configured resolution/range. In this case, the UE can inform the location server (via UE-QI) which quantization choice(/s) was(/were) used to encode RSTD measurements.

In some embodiments, the location server can indicate other useful parameters such as expected RSTD values via NW-QI and assume that the UE follows the assistance information, unless reported otherwise via UE-QI.

In one embodiment of minimizing signaling related to assistance information (UE-QI, NW-QI), one can make use of some information related to UE that is available to E-SMLC via the serving cell, such as uplink TOA, AoA, path-loss. This information can give an indication to E-SMLC what RSTD measurements are expected at UE corresponding to different cells. This can be useful as the quantization functions/policies at the UE are chosen according to absolute values of RSTD measurements.

Finally, it is noted that one or more of the above mentioned embodiments may be combined to generate a more efficient quantization approach.

Example of when action 414 is performed before action 412.

In some examples, action 414 is performed before action 412. In these examples, the user equipment 110 may arrange the measurements into groups based on absolute values of the measurements. Thereafter, the user equipment 110 may transform measurements of each group by subtracting an offset from each measurement, e.g. subtract an offset from each measurement value. According to other embodiments, the user equipment 110 can apply a certain analog compression function to only a certain group of measurements, and or relative difference policy to only a group of measurements.

In some cases, the grouping and transformation steps can be done interchangeably without any effect on quantization error, but with different computational and signaling complexity. Therefore, choice of a particular protocol should keep the computational complexity and signaling complexity in view.

As discussed earlier, E-QM can be designed under one of the following four assumptions:
  None of NW-QI and UE-QI is available (i.e. no additional signaling)
  NW-QI is available
  UE-NW is available
  Both NW-QI and UE-QI are available In the embodiments above, there were no or little information, such as NW-QI, UE-QI, needed to employ E-QM. In some cases, the location server is already sending assistance information to the UE for other purposes and E-QM can be employed without additional (NW-QI) signaling. In some cases, the UE can be pre-configured with some rules for selecting quantization functions and those rules are based on variables that are available to the location server anyway such as RSTD measurement reports, RSTD quality assessment reports, cell IDs. In some cases, little signaling from UE to the server (via UE-QI) is sufficient under a smart configuration at the UE. Such rules, configurations, can be specified in the relevant standard specifications.

In general, one should keep in mind the following general principle in the design of an efficient E-QM, UE-QI, and NW-QI:
  E-QM should be designed based on information that is common to location server and the UE;
  Independent (uncorrelated) information should be exchanged over different channels between UE and Location Server; and
  If it is not possible to exchange independent, then the design of E-QM should be supported such that it exploits the correlation between information that is transmitted over different channels between UE and Server.

Signaling Support for the Basic Embodiment

In one embodiment, the position estimation is computed at the location server and in another embodiment the position estimation is done at the target UE. In both cases, optionally it should be possible for the location server to request the capabilities of the UE prior to sending the assisted data. In the code sample displayed below, the capability of receiving the rstdReportPolicy by the UE has been added (shown by underlining) to the OTDOA-ProvideCapabilities signaling via LPP.

```
-- ASN1START
   OTDOA-ProvideCapabilities ::= SEQUENCE {
   otdoa-Mode     BIT STRING { ue-assisted (0) } (SIZE (1..8)),
   ...,
   supportedBandListEUTRA     SEQUENCE (SIZE (1..maxBands)) OF
SupportedBandEUTRA     OPTIONAL,
   supportedBandListEUTBA-v9a0     SEQUENCE (SIZE (1..maxBands)) OF
SupportedBandEUTRA-v9a0
   OPTIONAL,
   interFreqRSTDmeasurement-r10     ENUMERATED { supported }
   OPTIONAL,
   additionalNeighbourCellInfoList-r10     ENUMERATED { supported }
         OPTIONAL
      rstdReportPolicy  ENUMERATED { supported
}            OPTIONAL
      rstdReportPolicy-Mode
         BIT STRING { xxx (0) yyy (1) zzz (2) www (3) sss (4)   }
(SIZE (1..8))     OPTIONAL}
   maxBands INTEGER ::= 64
   SupportedBandEUTRA ::= SEQUENCE {
   bandEUTRA                INTEGER (1..maxFBI)
   }
   SupportedBandEUTRA-v9a0 ::=     SEQUENCE {
   bandEUTRA-v9a0           INTEGER (maxFBI-Plus1..maxFBI2)
   OPTIONAL
   }
   maxFBI               INTEGER ::=  64 -- Maximum value of
frequency band indicator
   maxFBI-Plus1             INTEGER ::= 65 -- lowest value extended
FBI range
   maxFBI2              INTEGER ::= 256  -- highest value
extended FBI range
   -- ASN1STOP
```

Figure 11:
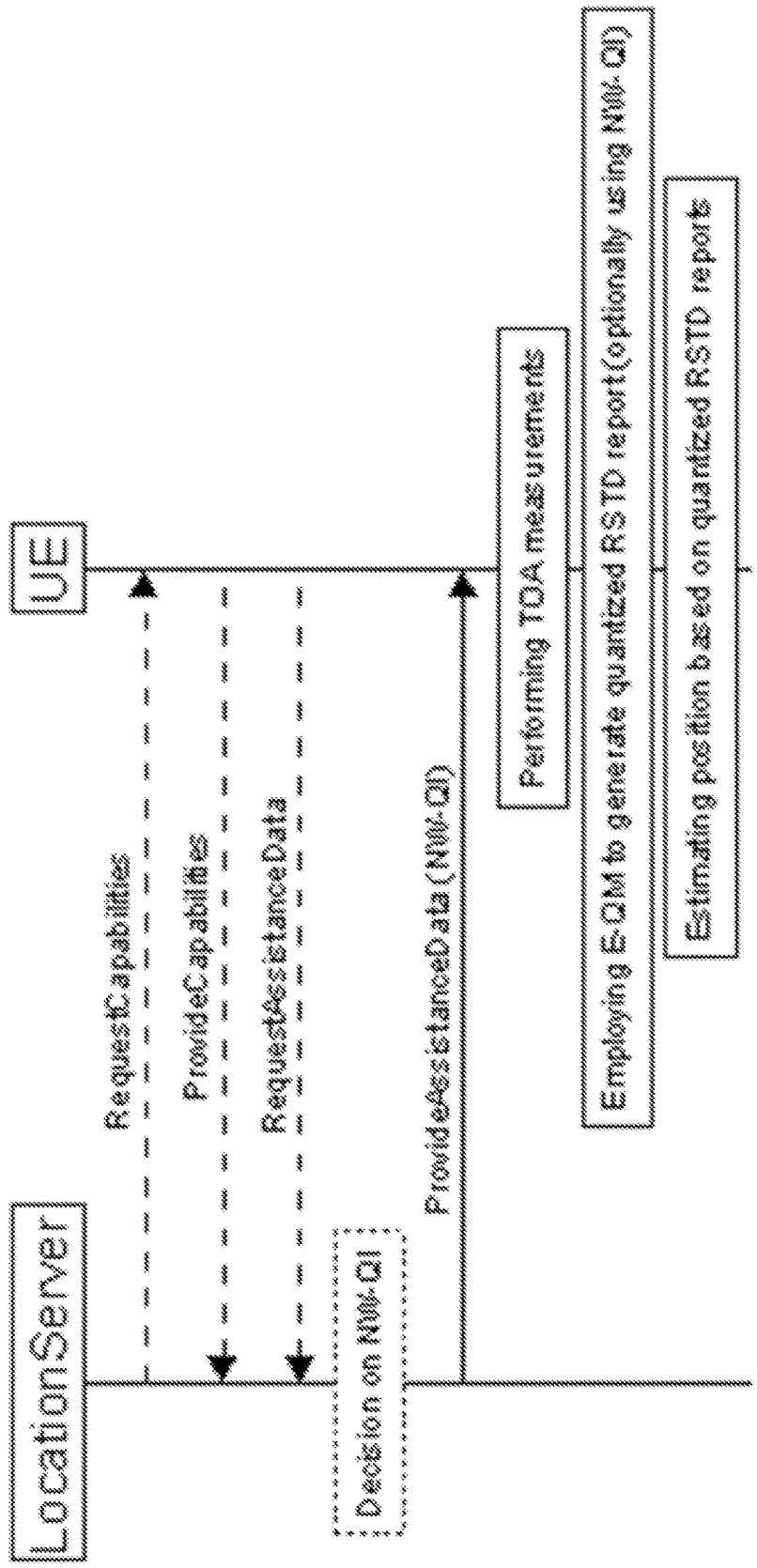
Figure 12:
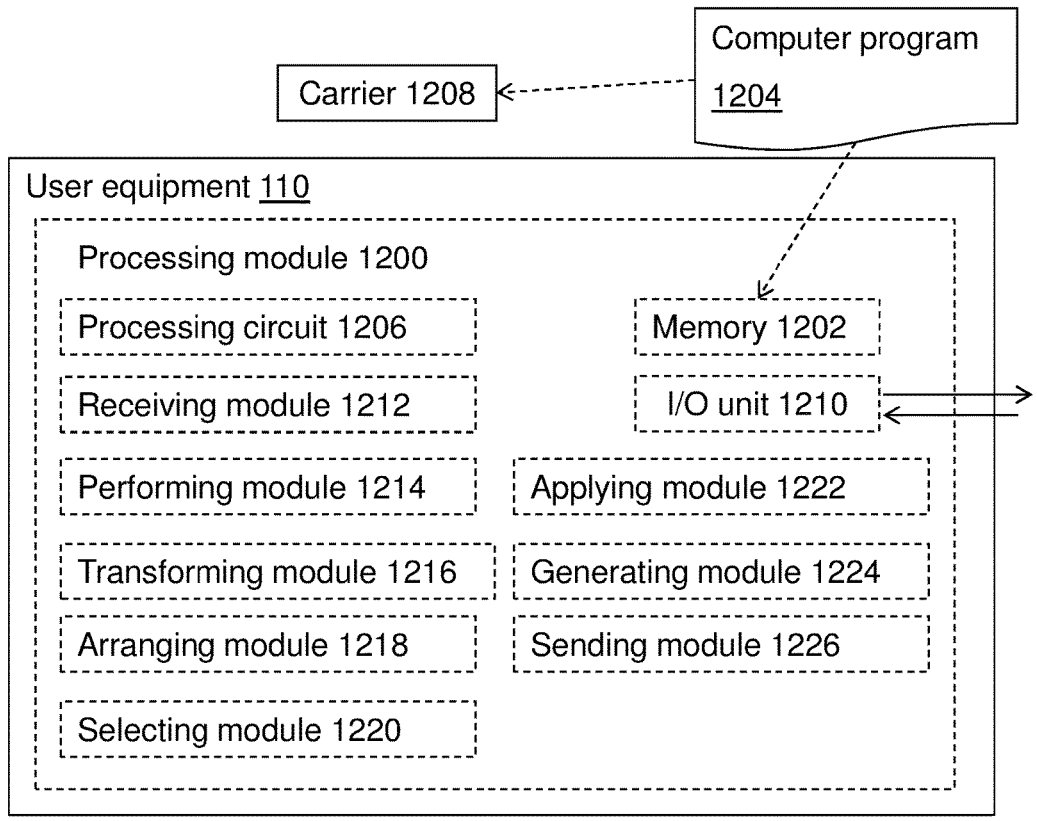

The additions in the signaling charts of FIG. 5 for both cases of considering location server as the initiator of the position estimation or the UE have been shown in FIGS. 11 and 12, respectively.

Figure 10:
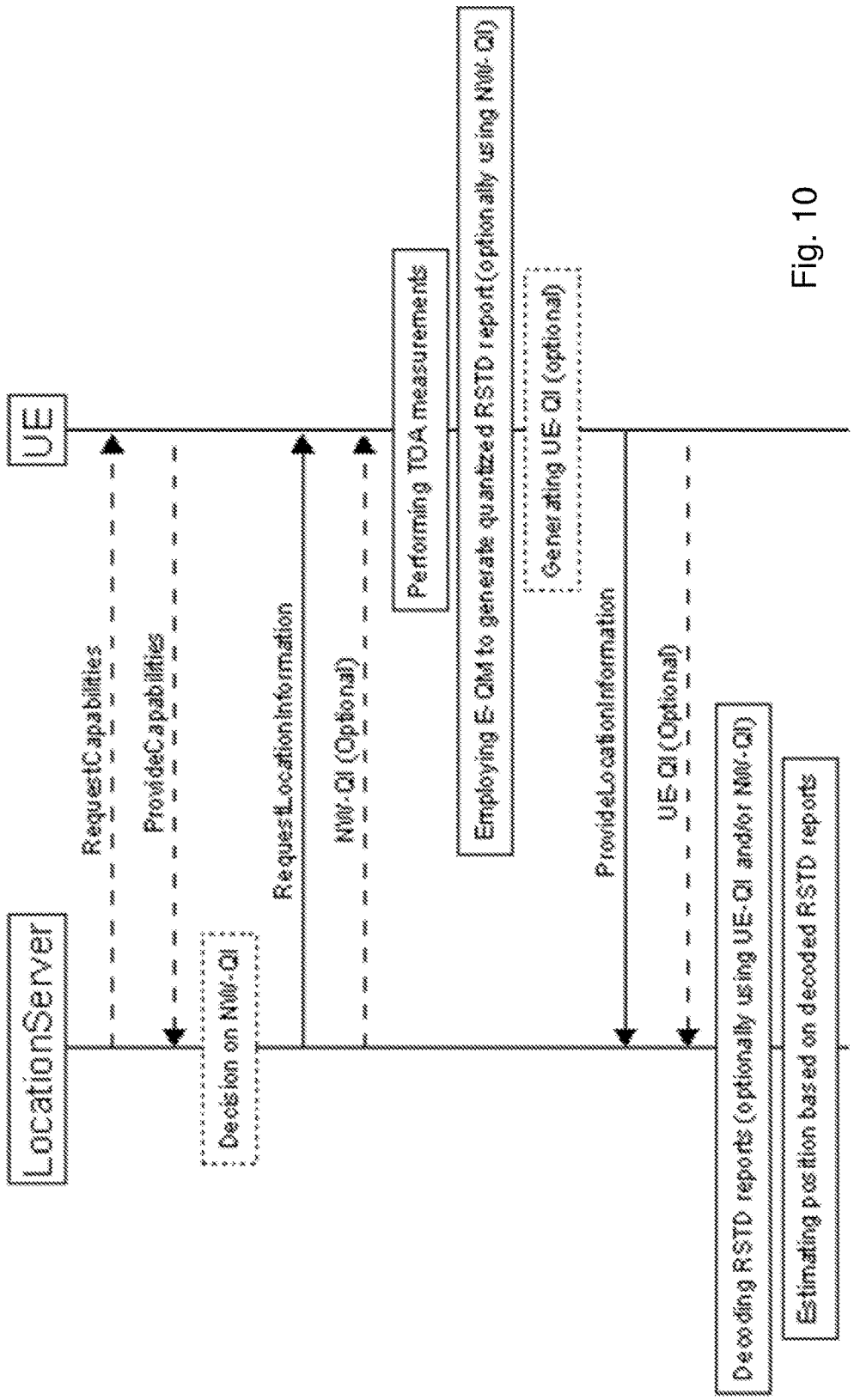

FIG. 10 depicts an embodiment based on LPP signaling additions in the case the location server initiates the positioning.

FIG. 11 illustrates an embodiment based on LPP signaling additions in the case the device initiates the positioning.

Finally, when the location server received the info that the target UE is capable of receiving RRP, the following additions (shown by underlining) can be applied to the OTDOA-ProvideAssistanceData via LPP, as shown in the code sample below:

The user equipment 110 may further comprise a memory 1202. The memory may comprise, such as contain or store, a computer program 1204.

According to some embodiments herein, the processing module 1200 comprises, e.g. 'is embodied in the form of' or 'realized by', a processing circuit 1206 as an exemplifying hardware module. In these embodiments, the memory 1202 may comprise the computer program 1204, comprising computer readable code units executable by the processing circuit 1206, whereby the user equipment 110 is operative to perform the methods of FIG. 4 and/or FIG. 6 and the like.

```
-- ASN1START
   OTDOA-ProvideAssistanceData ::= SEQUENCE {
               otdoa-ReferenceCellInfo         OTDOA-
ReferenceCellInfo                       OPTIONAL,    -- Need ON
               rstd-adaptiveQuantInfo          RSTD-
ReportPolicyInfo                        OPTIONAL,   -- Need ON
               otdoa-NeighbourCellInfo         OTDOA-
NeighbourCellInfoList                   OPTIONAL,    -- Need ON
               otdoa-Error                     OTDOA-
Error                                   OPTIONAL,    -- Need ON
      }
               ...
               RSTD- ReportPolicyInfo    ENUMERATED { xxx, yyy, zzz, www,
,...}
   -- ASN1STOP
```

FIG. 12 illustrates an exemplary block diagrams showing a UE, a carrier and a computer program respectively. With reference to FIG. 12, a schematic block diagram of embodiments of the user equipment 110 of FIG. 1 is shown.

The user equipment 110 may comprise a processing module 1200, such as a means, one or more hardware modules and/or one or more software modules for performing the methods described herein.

In some other embodiments, the computer readable code units may cause the user equipment 110 to perform the method according to FIG. 4 and/or 6 and the like when the computer readable code units are executed by the user equipment 110.

FIG. 12 further illustrates a carrier 1208, or program carrier, which comprises the computer program 1204 as described directly above.

In some embodiments, the processing module 1200 comprises an Input/Output unit 1210, which may be exemplified by a receiving module and/or a sending module as described below when applicable.

In further embodiments, the processing module 1200 may comprise one or more of a receiving module 1212, a performing module 1214, a transforming module 1216, an arranging module 1218, a selecting module 1220, an applying module 1222, a generating module 1224, a sending module 1226 as exemplifying hardware modules. In other examples, one or more of the aforementioned exemplifying hardware modules may be implemented as one or more software modules.

According to the embodiments herein, the user equipment 110 is thus configured for managing a measurement report.

With the various embodiments described above, the user equipment 110, the processing module 1200 and/or an appropriate one of the modules listed above is configured for performing the methods of the user equipment as disclosed herein.

Figure 13:
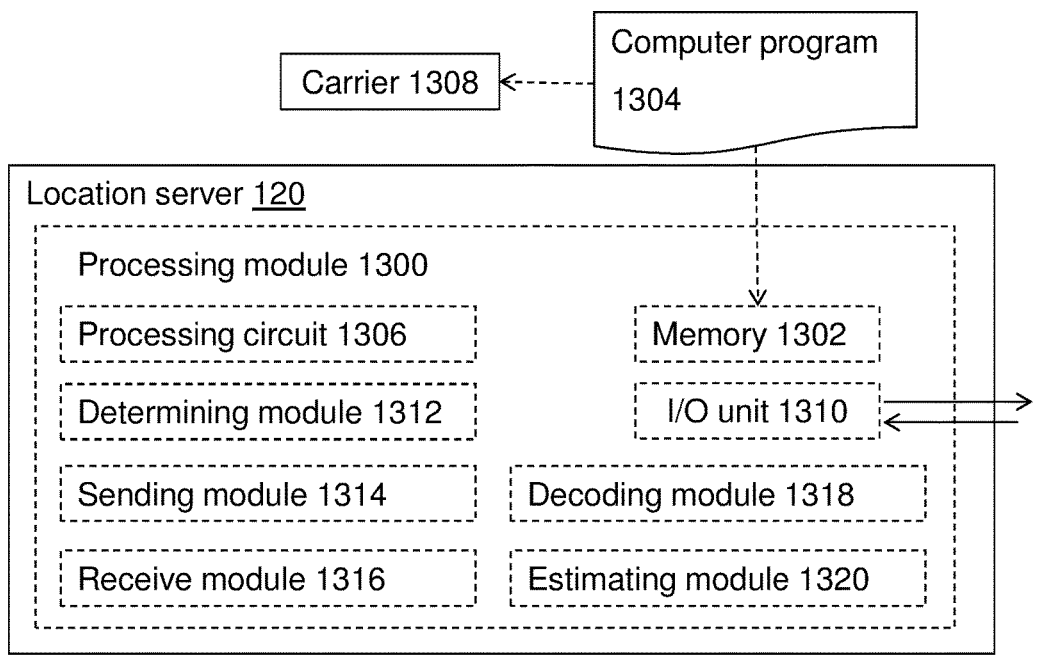

FIG. 13 illustrates an exemplary block diagrams showing a location server, a carrier and a computer program respectively. With reference to FIG. 13, a schematic block diagram of embodiments of the location server 120 of FIG. 1 is shown.

The location server 120 may comprise a processing module 1300, such as a means, one or more hardware modules and/or one or more software modules for performing the methods described herein.

The location server 120 may further comprise a memory 1302. The memory may comprise, such as contain or store, a computer program 1304.

According to some embodiments herein, the processing module 1300 comprises, e.g. 'is embodied in the form of' or 'realized by', a processing circuit 1306 as an exemplifying hardware module. In these embodiments, the memory 1302 may comprise the computer program 1304, comprising computer readable code units executable by the processing circuit 1306, whereby the location server 120 is operative to perform the methods of FIG. 4 and/or FIG. 5 and the like.

In some other embodiments, the computer readable code units may cause the location server 120 to perform the method according to FIG. 4 and/or 5 and the like when the computer readable code units are executed by the location server 120.

FIG. 13 further illustrates a carrier 1308, or program carrier, which comprises the computer program 1304 as described directly above.

In some embodiments, the processing module 1300 comprises an Input/Output unit 1310, which may be exemplified by a receiving module and/or a sending module as described below when applicable.

In further embodiments, the processing module 1300 may comprise one or more of a determining module 1312, a sending module 1314, a receiving module 1316, a decoding module 1318, an estimating module 1320 as exemplifying hardware modules. In other examples, one or more of the aforementioned exemplifying hardware modules may be implemented as one or more software modules.

According to the embodiments herein, the location server 120 is thus configured for managing a measurement report.

With the various embodiments described above, the location server 120, the processing module 1300 and/or an appropriate one of the modules listed above is configured for performing the methods of the location server 120 as disclosed herein.

Figure 14:
Figure 14:
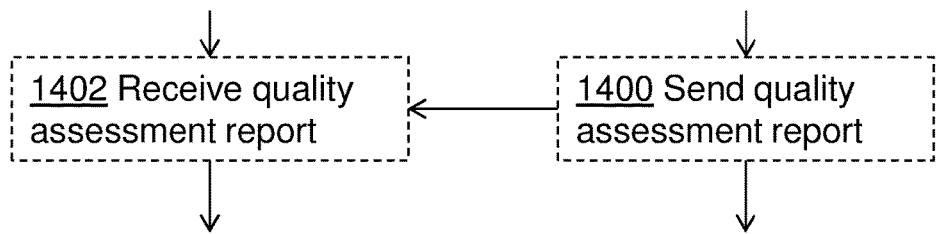

FIG. 14 illustrates an exemplifying method performed by a user equipment and a location server. Returning to the quality assessment report, now referring to FIG. 4, the methods of the user equipment 110 and the location server may include the following actions in further embodiments.

Action 1400

The user equipment 110 may send a quality assessment report, such as the RSTD quality assessment report. The quality assessment report may indicate whether the quality assessment relates to uncertainty in RSTD measurement or uncertainty due to quantization error or both. In this manner, the location server 120 is made aware of a reason for the uncertainty.

Action 1402

The location server 120 may receive the quality assessment report. Thus, thanks to that the location server 120 now is made aware of the reason for the uncertainty, the location server 120 may compensate for e.g. quantization uncertainty (or quantization error) when performing actions 428 and/or 430.

For example, when the quality assessment report indicates that uncertainty relates to quantization error, the location server 120 may have pre-defined quantization functions, where a respective pre-defined quantization function is associated with a certain value, or range, of the quality assessment report.

Additionally, this means that the user equipment 110, the processing module 1200 and/or the sending module 1226, or another sending module (not shown), may be configured for sending the quality assessment report, which indicates whether or not the quality assessment relates to uncertainty in RSTD measurement or uncertainty due to quantization error or both.

Furthermore, this means that the location server 120, the processing module 1300 and/or the receiving module 1316, or another receiving module (not shown), may be configured for receiving the quality assessment report, which indicates whether or not the quality assessment relates to uncertainty in RSTD measurement or uncertainty due to quantization error or both.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner.

As used herein, the term "unit" may refer to one or more functional units, each of which may be implemented as one or more hardware modules and/or one or more software modules in a node.

As used herein, the term "program carrier" may refer to one of an electronic signal, an optical signal, a radio signal, and a computer readable medium. In some examples, the program carrier may exclude transitory, propagating signals, such as the electronic, optical and/or radio signal. Thus, in these examples, the carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software component, a software function, a software engine, an executable binary software file or the like.

As used herein, the term "processing circuit" may refer to a processing unit, a processor, an Application Specific integrated Circuit (ASIC), a Field-Programmable Gate Array (FPGA) or the like. The processing circuit or the like may comprise one or more processor kernels.

As used herein, the expression "configured to", or "configured for", may mean that a processing circuit is configured to, or adapted to, by means of software configuration and/or hardware configuration, perform one or more of the actions described herein.

As used herein, the term "action" may refer to an action, a step, an operation, a response, a reaction, an activity or the like.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a Memory Stick, a Multimedia Card (MMC), Secure Digital (SD) card, etc.

As used herein, the term "computer readable code units" may be text of a computer program, parts of or an entire binary file representing a computer program in a compiled format or anything there between.

As used herein, the term "radio resource" may refer to a certain coding of a signal and/or a time frame and/or a frequency range in which the signal is transmitted. In some examples, a resource may refer to one or more Physical Resource Blocks (PRB) which is used when transmitting the signal. In more detail, a PRB may be in the form of Orthogonal Frequency Division Multiplexing (OFDM) PHY resource blocks (PRB). The term "physical resource block" is known from 3GPP terminology relating to e.g. Long Term Evolution Systems.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a bit string.

As used herein, the term "set of" may refer to one or more of something. E.g. a set of devices may refer to one or more devices, a set of parameters may refer to one or more parameters or the like according to the embodiments herein.

As used herein, the term "measurement(s)" may refer, as evident from the context, one or more measurement values, which may be have been measured by the user equipment.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method performed by a user equipment, UE, the method comprising:
    performing Reference Signal Time Difference, RSTD, measurements by estimating or measuring a Time Of Arrival, TOA, of a Positioning Reference Signal, PRS, from respective base station of a plurality of base stations;
    encoding the RSTD measurements by employing an Enhanced RSTD Quantization Method, E-QM, having optimizable quantization, or by using NetWork Assisted RSTD Quantization Information, NW-QI, comprising information for performing enhanced quantization, received from a location server, while encoding the RSTD measurements; and
    sending UE assisted RSTD Quantization Information, UE-QI, comprising additional information for decoding of the encoded RSTD measurements, to the location server, the UE-QI including the encoded RSTD measurements.

2. The method according to claim 1 wherein employing the E-QM method comprises transforming the RSTD measurements, grouping the RSTD measurements, and employing a quantization function for each RSTD measurement group.

3. The method according to claim 2 wherein transforming comprises subtracting a constant offset value from the RSTD measurements in order to reduce the absolute values of the RSTD measurements.

4. The method according to claim 2 wherein grouping the RSTD measurements comprises identifying a group of RSTD measurements having RSTD measurements values above a threshold value and identifying another group having RSTD measurements values below the threshold value.

5. The method according to claim 2 wherein the quantization function for each RSTD measurement group comprises linearly quantizing the measurements while using a quantization resolution and wherein the quantization resolution refers to the number of bits used for representing the quantized measurements.

6. The method according to claim 1 further comprising estimating a position of the UE based on the UE-QI including the encoded RSTD measurements.

7. A method performed by a location server, the method comprising:
    at least one from the group of:
        transmitting NetWork assisted Reference Signal Time Difference, RSTD, Quantization Information, NW-QI, comprising information for performing enhanced quantization, to a User Equipment, UE; and
        receiving UE assisted RSTD Quantization Information, UE-QI, comprising additional information for decoding of encoded RSTD measurements, from the UE, including encoded RSTD measurements and further receiving RSTD measurements quality assessment report from the UE;
    decoding the RSTD quantized measurements using the UE-QI and/or the NW-QI; and
    estimating a position of the UE based on the decoded RSTD quantized measurements.

8. The method according to claim 7 further comprising requesting capabilities of the UE prior to receiving UE-QI from the UE.

9. A user equipment, UE, comprising a processor and a memory, said memory containing instructions executable by said processor whereby said UE is operative to:
perform Reference Signal Time Difference, RSTD, measurements by measuring or estimating a Time Of Arrival, TOA, of a Positioning Reference Signal, PRS, from respective base station of a plurality of base stations;
encode the RSTD measurements by employing a Enhanced RSTD Quantization Method, E-QM, having optimizable quantization, or by using NetWork assisted RSTD Quantization Information, NW-QI, comprising information for performing enhanced quantization, received from a location server, while encoding the RSTD measurements; and
send UE assisted RSTD Quantization Information, UE-QI, comprising additional information for decoding of the encoded RSTD measurements, to the location server, the UE-QI including the encoded RSTD measurements.

10. The UE according to claim 9 being operative to employ the E-QM method by transforming the RSTD measurements, grouping the RSTD measurements, and employing a quantization function for each RSTD measurement group.

11. The UE according to claim 10 being operative to transform the RSTD measurements by subtracting a constant offset value from the RSTD measurements in order to reduce the absolute values of the RSTD measurements.

12. The UE according to claim 10 being operative to group the RSTD measurements by identifying a group of RSTD measurements having RSTD measurements values above a threshold value and identifying another group having RSTD measurements values below the threshold value.

13. The UE according to claim 10 being operative to employ a quantization function for each RSTD measurement group, wherein the quantization function for each RSTD measurement group comprises linearly quantizing the measurements while using a quantization resolution and wherein the quantization resolution refers to the number of bits used for representing the quantized measurements.

14. The UE according to claim 9 being further operative to estimate a position of the UE based on the UE-QI including the encoded RSTD measurements.

15. A method performed by a location server comprising:
at least one from the group of:
transmitting NetWork assisted Reference Signal Time Difference, RSTD, Quantization Information, NW-QI, comprising information for performing enhanced quantization, to a User Equipment, UE; and
receiving UE assisted RSTD Quantization Information, UE-QI, comprising additional information for decoding of encoded RSTD measurements, from the UE, including encoded RSTD measurements and further receiving RSTD measurements quality assessment report from the UE;
decoding the RSTD quantized measurements using the UE-QI and/or the NW-QI; and
estimating position of the UE based on the decoded RSTD quantized measurements.

16. The method according to claim 15 further comprising requesting capabilities of the UE prior to receiving UE-QI from the UE.

17. A location server comprising a processor and a memory, said memory containing instructions executable by said processor whereby said location server is operative to:
at least one from the group of:
transmit NetWork assisted Reference Signal Time Difference, RSTD, Quantization Information, NW-QI, comprising information for performing enhanced quantization, to a User Equipment, UE; and
receive UE assisted RSTD Quantization Information, UE-QI, comprising additional information for decoding of encoded RSTD measurements, from the UE, including encoded RSTD measurements and further receiving RSTD measurements quality assessment report from the UE;
decode the RSTD quantized measurements using the UE-QI and/or the NW-QI; and
estimate a position of the UE based on the decoded RSTD quantized measurements.

18. The location server according to claim 17 is further operative to request capabilities of the UE prior to receiving UE-QI from the UE.

19. The method of claim 1 wherein the UE-QI comprises an indication of at least one from the group of: a transformation; a grouping; a quantization choice; a range for which an approximation function is valid; a coefficient of a polynomial function; and a range or interval of quantized values.

20. The method of claim 7 wherein the UE-QI comprises an indication of at least one from the group of: a transformation; a grouping; a quantization choice; a range for which an approximation function is valid; a coefficient of a polynomial function; and a range or interval of quantized values.

21. The UE of claim 9 wherein the UE-QI comprises an indication of at least one from the group of: a transformation; a grouping; a quantization choice; a range for which an approximation function is valid; a coefficient of a polynomial function; and a range or interval of quantized values.

22. The method of claim 15 wherein the UE-QI comprises an indication of at least one from the group of: a transformation; a grouping; a quantization choice; a range for which an approximation function is valid; a coefficient of a polynomial function; and a range or interval of quantized values.

23. The location server of claim 17 wherein the UE-QI comprises an indication of at least one from the group of: a transformation; a grouping; a quantization choice; a range for which an approximation function is valid; a coefficient of a polynomial function; and a range or interval of quantized values.

* * * * *